US012577159B2

(12) United States Patent
Fan et al.

(10) Patent No.: US 12,577,159 B2
(45) Date of Patent: Mar. 17, 2026

(54) DRY MIXES AND CEMENTS CONTAINING CELLULOSE ETHERS AS LUBRICATIVE ADDITIVES FOR ROLLER COMPACTED CONCRETE APPLICATIONS AND METHODS OF USING THEM

(71) Applicants: Dow Global Technologies LLC, Midland, MI (US); Rohm and Haas Company, Collegeville, PA (US)

(72) Inventors: Yi Fan, Lake Jackson, TX (US); Jorg Theuerkauf, Midland, MI (US); Michael J. Radler, Saginaw, MI (US); Stacey A. Saba, Eagleville, PA (US); Kurt A. Koppi, Midland, MI (US); Sean M. Keenan, Midland, MI (US); Jessica R. Levin, Philadelphia, PA (US); Robert L. Sammler, Midland, MI (US)

(73) Assignees: DOW GLOBAL TECHNOLOGIES LLC, Midland, MI (US); Rohm and Hass Company, Collegeville, PA (US)

( * ) Notice: Subject to any disclaimer, the term of this patent is extended or adjusted under 35 U.S.C. 154(b) by 428 days.

(21) Appl. No.: 18/250,807

(22) PCT Filed: Feb. 11, 2022

(86) PCT No.: PCT/US2022/016072
§ 371 (c)(1),
(2) Date: Apr. 27, 2023

(87) PCT Pub. No.: WO2022/177807
PCT Pub. Date: Aug. 25, 2022

(65) Prior Publication Data
US 2023/0382797 A1     Nov. 30, 2023

Related U.S. Application Data

(60) Provisional application No. 63/151,089, filed on Feb. 19, 2021.

(51) Int. Cl.
| | |
|---|---|
| *C04B 24/38* | (2006.01) |
| *C04B 24/20* | (2006.01) |
| *C04B 24/26* | (2006.01) |
| *C04B 28/04* | (2006.01) |
| *C04B 40/00* | (2006.01) |
| *C04B 103/32* | (2006.01) |
| *C04B 111/00* | (2006.01) |
| *E01C 7/14* | (2006.01) |
| *E01C 19/00* | (2006.01) |

(52) U.S. Cl.
CPC ............ *C04B 24/383* (2013.01); *C04B 24/20* (2013.01); *C04B 24/2647* (2013.01); *C04B 28/04* (2013.01); *C04B 40/0046* (2013.01); *E01C 7/142* (2013.01); *E01C 19/002* (2013.01); *C04B 2103/32* (2013.01); *C04B 2111/0075* (2013.01)

(58) Field of Classification Search
CPC ... C04B 24/383; C04B 24/20; C04B 24/2647; C04B 28/04; C04B 40/0046; C04B 2103/32; C04B 2111/0075; C04B 28/02; C04B 20/0076; C04B 20/008; C04B 24/18; C04B 24/226; C04B 40/0259; E01C 7/142; E01C 19/002
See application file for complete search history.

(56) References Cited

U.S. PATENT DOCUMENTS

| | | | |
|---|---|---|---|
| 5,622,558 A | 4/1997 | Berke et al. | |
| 8,377,196 B2 | 2/2013 | Bury et al. | |
| 9,056,792 B2 | 6/2015 | Weerawarna et al. | |
| 9,416,052 B2 | 8/2016 | Feldman et al. | |
| 2017/0107673 A1* | 4/2017 | Zampini ................ E01C 7/142 | |

FOREIGN PATENT DOCUMENTS

| | | | |
|---|---|---|---|
| CN | 101182139 | 5/2008 | |
| CN | 108975758 | 12/2018 | |
| CN | 110143791 | 8/2019 | |
| CN | 111302718 | 6/2020 | |
| EP | 1266877 | 12/2002 | |
| GB | 2520634 A * | 5/2015 | ............... B09B 3/27 |
| KR | 20170011776 | 2/2017 | |
| WO | 2003048070 | 6/2003 | |
| WO | 2005105702 | 11/2005 | |
| WO | 201205103 | 1/2012 | |
| WO | 2020187742 | 9/2020 | |

OTHER PUBLICATIONS

Bartelmus, Die Analytik von Celluloseathergruppen, Z. Anal. Chem., 1977, vol. 286, pp. 161-190.

* cited by examiner

*Primary Examiner* — Pamela H Weiss

(57) ABSTRACT

The present invention provides a dry mix composition of a low-viscosity cellulose ether (50 to 750 mPa·s at 1 wt. % solids, at 20 C, and a 514 s-1 shear rate, using a strain-controlled rotational rheometer (for example, ARES-G2™, TA Instruments), a graded aggregate, and a hydraulic cement, or a granular wet cement composition of the cement, graded aggregate and an admixture therefor including the cellulose ether. The wet granular hydraulic cement composition behaves like asphalt compositions and has zero or near zero slump, a high lubricity and from 5 wt. % to less than 13 wt. % of water, or, preferably from greater than 5 to 10.5 wt. %, based on the total weight of the granular wet cement composition. The low-viscosity cellulose ether enables lubricity without impairing compaction and without causing air entrainment.

11 Claims, No Drawings

DRY MIXES AND CEMENTS CONTAINING CELLULOSE ETHERS AS LUBRICATIVE ADDITIVES FOR ROLLER COMPACTED CONCRETE APPLICATIONS AND METHODS OF USING THEM

The present invention relates to a dry mix composition for use in roller compacted concrete (RCC) and low or zero slump wet cement compositions made therefrom as well as methods comprising paving the wet cement compositions. More particularly, it relates to dry mix compositions comprising hydraulic cement, aggregate, such as sand, finely divided granular materials, such as limestone, and from 0.05 to 1.3 wt. %, or, preferably, from 0.08 to 1.1 wt. %, based on the total weight of the dry mix compositions, of one or more cellulose ethers, and wherein wet cement compositions made from the dry mix compositions and up to 13 wt. % or up to 10.5 wt. % of water, based on the total weight of the granular wet cement compositions, exhibit a slump as determined in accordance with ASTM C143 (2010), using a stainless steel cone height mm, top diameter 40 mm, bottom diameter 90 mm, and a steel rod stirrer 9.5 mm diameter, 266.7 mm length, of less than 6 mm, or, preferably, less than 4.5 mm.

Roller Compacted Concrete (RCC) is a durable low-cost paving technology that has been used for secondary roads. Unlike traditional concrete pavement, RCC can be paved with asphalt paving equipment without the use of forms, molds, or reinforcements. Return to service for RCC roads can be as fast as 1 day after paving, whereas traditional concrete pavements can require weeks of curing before opening roads to traffic. The easier paving process and fast return to service makes RCC a desirable option so long as it can retain a smooth appearance and the characteristic high durability of concrete pavement. However, RCC has a higher volume of aggregate as compared to conventional concrete; and the exposed surface of known RCC pavement has a high area fraction of aggregate exposed and may be rough and subject to rapid deterioration because of insufficient compaction and loss of strength after paving, limiting RCC's use to parking lots, industrial roads, base layers, and shoulders.

In known versions of RCC, the compaction and workability issues have been managed by addition of chemical admixtures, as well as formulation optimization. The term "compaction" is defined as the act or result of densifying a material through the removal of air voids while moisture content is maintained. However, in paving a material an alternative path of "consolidation" can occur upon applying the pressure meant to compact the pavement, wherein the material is densified both through the removal of air voids and water. The removal of water has detrimental effects on the paving material and can ultimately cause failures and loss of strength. Creating a gradient of water composition when compacting from only the top surface can also be detrimental as the reduced water level at the top adversely impacts cement cure, while the excess water at the bottom can lead to a layer cured in the swollen state. However, admixtures were designed to reside in the fluid or paste phase of cement which is itself limited in RCC compositions. To see an impact on the desired compaction and workability, an extremely high level of admixture is required, making them cost-prohibitive and/or negatively impacting strength or workability. It would be desirable to create an RCC forming dry mix that enables good compaction without a high proportion of admixture ingredients.

U.S. Pat. No. 8,377,196 B2 to Bury et al., discloses a dry cast cementitious composition of a rheology modifying additive comprising of at least one shear thinning additive A, such as cellulose ethers, including hydroxyalkyl cellulose, salts of carboxyalkyl cellulose, carboxyalkyl hydroxyalkyl cellulose, hydroxyalkyl hydroxyalkyl cellulose, and mixtures thereof), and one non-shear thinning additive B. The compositions can enable improved cycle time, ease of finishing, compressive strength and compaction ratio. However, the compositions of Bury et al. require a mold and fail to develop adequate viscosity to enable the provision of a composition which exhibits little or no slump when mixed, ruling out use in any compacted concrete paving solution.

In accordance with the present invention, the present inventors have solved the problem of providing a dry mix that provides a wet cement composition exhibiting good compaction and little or no slump and which is suitable for use in, for example, roller compaction or paving methods.

STATEMENT OF THE INVENTION

In accordance with the present invention, dry mix compositions comprise: hydraulic cement, for example, ordinary Portland cement, aluminate cement, fly ash, pozzolans, and their mixtures, in the amount of from 10 to 23 wt. % or, preferably, from 12 to 20 wt. %, based on the total weight of the dry mix composition, graded aggregate in the amount of from 70 to 89.95 wt. % or, preferably, in the amount of from 75 to 89.65 wt. %, based on the total weight of the dry mix composition comprising i) one or more coarse aggregates having a sieve particle size of from 500 microns to 20 mm or, preferably from 1 to 18 mm, for example, sand, limestone, gravel, granite, or clay, or, preferably sand or gravel, or, preferably, a combination of a first coarse aggregate and a second coarse aggregate wherein the first coarse aggregate has a sieve particle size of from 200 microns to 3000 microns and the second coarse aggregate has a sieve particle size of from 2000 microns to 20 mm wherein the ratio of the sieve particle size of the second coarse aggregate to that of the first coarse aggregate ranges from to 1.5:1, or, preferably from 10:1 to 2:1, and ii) one or more fine aggregates, preferably limestone or sand, having a sieve particle size of from 40 to less than 3000 microns or, preferably, from 70 to 3000 microns, and, a cellulose ether composition of one cellulose ether or a mix of two of more cellulose ethers in the amount of from 0.05 to 1.3 wt. % or, preferably, from 0.08 to 1.1 wt. %, or, more preferably, from 0.08% to 0.35 wt. %, based on the total weight of the dry mix composition, wherein the cellulose ether or mix of two or more cellulose ethers has an aqueous solution viscosity at 1 wt. % cellulose ether solids, at 20° C., and a 514 s$^{-1}$ shear rate ranging from 50 to 750 mPa*s, or, preferably, from 80 to 500 mPa*s, as determined using a strain-controlled rotational rheometer (preferably an ARES-G2™, TA Instruments, New Castle, DE equipped with a Peltier temperature controller, TRIOS™ data acquisition software (TA Instruments) and DIN (Deutsches Institut für Normung e.V. in German meaning German Institute for Standardization) sample fixtures comprising concentric cylinders), and employing a strain rate sweep from 0.03 to 300/s at ten points/decade, and reporting the average of two trials for each cellulose ether composition, wherein the aqueous solution is made by drying a powder of the cellulose ether over-
night in a 70° C. vacuum oven, dispersing it into hot
water at 70° C., and allowing it to dissolve while
cooling with stirring to room temperature and refrig-
erating it at 4° C. overnight, wherein the weight ratio of the total coarse aggregate to
the total fine aggregate in the graded aggregate ranges
from 4:1 to 0.9:1, or, preferably, from 3:1 to 1:1; and, further wherein, all wt. % s add to 100%. The dry mix
compositions in accordance with the present invention
may further comprise one or more superplasticizers
chosen from a polycarboxylate ether containing, naph-
thalene sulfonate containing, lignosulfonate containing
superplasticizers, or mixtures thereof, preferably, a
polycarboxylate ether containing superplasticizer.

In the dry mix compositions in accordance with the
present invention, the hydraulic cement may be chosen from
an ordinary Portland cement, an aluminate cement, a poz-
zolan, or their mixtures, or, preferably, an ordinary Portland
cement, an aluminate cement, or their mixture.

Preferably, in the graded aggregate of the dry mix com-
positions in accordance with the present invention, the ratio
of the sieve particle size of the total coarse aggregate to the
sieve particle size of the fine aggregate ranges from 10:1 to
2:1, or, preferably, from 8:1 to 2:1.

More preferably, the dry mix compositions in accordance
with the present invention comprise as the coarse aggregate
in the graded aggregate a mixture of a first coarse aggregate,
such as sand or gravel, having a sieve particle size of from
300 microns to 2000 microns and a second coarse aggregate
having a sieve particle size of from 2000 microns to 18 mm,
such as gravel or stone, wherein the ratio of the sieve particle
size of the second coarse aggregate to the sieve particle size
of the first coarse aggregate ranges from 15:1 to 1.5:1, or,
preferably from 10:1 to 2:1.

In the dry mix compositions in accordance with the
present invention, at least one of the one or more cellulose
ethers has a side chain chosen from hydroxyethyl, hydroxy-
propyl, methyl, and combinations thereof, or, preferably,
hydroxyethyl and methyl. More particularly, at least one of
the one or more cellulose ethers is a hydroxyethyl methyl
cellulose ether having a hydroxyethyl content (MS) ranging
from 0 and 0.4, and a methoxyl content (DS) of from 1.2 to
1.8 or is a hydroxyethyl cellulose having a hydroxyethyl
content (MS) of from 1.4 to 2.4, or, preferably, from 1.8 to
2.2.

In the dry mix compositions in accordance with the
present invention, the superplasticizers, when present, may
be used in amounts of from 0.1 to 0.5 wt. % of polycar-
boxylate ethers, from 0.2 to 5.0 wt. % or from 0.3 to 1.0 wt.
% of naphthalene sulfonate or lignosulfonate containing
materials, preferably from 0.1 to 0.5 wt. % of polycarboxy-
late ethers.

Preferably, the dry mix compositions in accordance with
the present invention comprise less than 2 wt. % total of
cellulose ether plus superplasticizer, based on the total
weight of the dry mix composition.

The dry mix compositions in accordance with the present
invention when mixed with a separate component of water
in the amount of from 5.0 to 13.0 wt. %, or, preferably, from
greater than 5.0 to 10.5 wt. %, based on the total weight of
the resulting composition, provide a granular wet cement
composition in accordance with the second aspect of the
present invention wherein the composition has a slump as
determined in accordance with ASTM C143 (2010), by
mixing the dry mix in a plastic bag, adding the powder to the
indicated amount of water in a Hobart mixing bowl, mixing twice on speed 1 for 15 s and stopping after mixing each
time to scrape the sides of the bowl, slaking the mixture for
minutes and pouring the mixture in three equal layers into a
stainless-steel cone (height 80 mm, top diameter 40 mm and
bottom diameter 90 mm) which has been dampened with
water via a sponge and placed on a non-absorbent surface,
filling each layer and mixing with a stainless-steel rod
(preferably, of 266.7 mm length and 9.5 mm diameter) in a
circular motion, positioning the rod parallel to the sides of
the cone and working to a vertical position to finish in the
center, finishing the surface of the wet cement composition
flush with the top of the cone, pulling the cone up and off of
the wet cement composition and recording the slump within
30 seconds by measuring the total height of the cone and
reporting the difference in the measured height and 80 mm,
of less than 6 mm, or, preferably, less than 4.5 mm.

The dry mix compositions in accordance with the present
invention may comprise one-component of a two-compo-
nent composition, wherein the first component comprises
the dry mix composition, and the second component com-
prises water, wherein either the first component or the
second component comprises the one or more cellulose
ethers and, if used, any of the one or more superplasticizers.

In a second aspect in accordance with the present inven-
tion, granular wet cement compositions from a dry mix
composition and water comprise:

hydraulic cement, for example, pozzolans, ordinary Port-
land cement, aluminate cement, fly ash, and their
mixtures, in the amount from 10 to 23 wt. % or,
preferably, from 12 to 20 wt. %, based on the total
weight of the dry mix composition, graded aggregate in the amount from 70 to 89.95 wt. % or,
preferably, in the amount from 75 to 89.65 wt. %, based
on the total weight of the dry mix composition com-
prising i) one or more coarse aggregates having a sieve particle
size of from 200 microns to 20 mm, for example, sand,
limestone, gravel, granite, or clay, or, preferably sand,
or, more preferably, a combination of a first coarse
aggregate and a second coarse aggregate wherein the
first coarse aggregate has a sieve particle size of from
200 microns to 3000 microns and the second coarse
aggregate has a sieve particle size of from 2000
microns to 20 mm wherein the ratio of the sieve particle
size of the second coarse aggregate to that of the first
coarse aggregate ranges from 15:1 to 1.5:1, or, prefer-
ably, from 10:1 to 2:1, and ii) one or more fine aggregates, preferably limestone,
having a sieve particle size of from 40 microns to 3000
microns or, preferably, from 70 microns to 3000
microns, a cellulose ether or a mix of two of more
cellulose ethers in the amount of from 0.05 to 1.3 wt.
% or, preferably, from 0.08 to 1.1 wt. %, or, more
preferably, from 0.08% to 0.35 wt. %, wherein the
cellulose ether or mix of two or more cellulose ethers
has an aqueous solution viscosity at 1 wt. % cellulose
ether solids, at 20° C., and a 514 s$^{-1}$ shear rate, as
determined using a strain-controlled rotational rheom-
eter (preferably, an ARES-G2™, TA Instruments, New
Castle, DE, equipped with a Peltier temperature con-
troller, TRIOS™ data acquisition software (TA Instru-
ments) and DIN (Deutsches Institut für Normung e.V.
in German meaning German Institute for Standardiza-
tion) sample fixtures comprising concentric cylinders),
employing a strain rate sweep from 0.03 to 300/s at ten
points/decade, and as expressed as the average of two
trials for each cellulose ether, ranging from 50 to 650 mPa·s, or, preferably, from 80 to 500 mPa·s, the aqueous solution is made by drying a powder of the cellulose ether overnight in a 70° C. vacuum oven, dispersing it into hot water at 70° C., and allowing it to dissolve while cooling with stirring to room temperature and refrigerating it at 4° C. overnight, and, water in the amount of from 5.0 to 13.0 wt. %, or, preferably, from greater than 5.0 to 10.5 wt. % based on the total weight of the granular wet cement composition, wherein the wet cement compositions have a water saturation level of less than 58%, or, preferably, 56.5% or less as defined by the percentage of voids filled with wet cement, or cement plus water, as expressed by the following equation:

$$\text{Water saturation} = (V_w + V_c)/V_v,$$

wherein $V_w$ is the volume of water in the wet cement composition, $V_c$ is the volume of cement $V_c = m_c/\rho_c$, where $m_c$ is the mass of cement in the wet cement composition and $\rho_c$ is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mixing well and pouring all of them into a container and calculating void volume $V_v = V - \Sigma(m_i/\rho_i)$, further wherein, the weight ratio of the total coarse aggregate to the total fine aggregate in the graded aggregate ranges from 4:1 to 0.9:1, or, preferably, from 3:1 to 1:1; and, still further wherein, all wt. % s in the dry mix composition add to 100%.

In accordance with the granular wet cement compositions of the present invention, the ratio of the sieve particle size of the total coarse aggregate to the sieve particle size of the fine aggregate may range from 20:1 to 1.5:1 or, preferably, from 10:1 to 2:1.

More preferably, the granular wet cement compositions in accordance with the second aspect of the present invention comprise as the coarse aggregate in the graded aggregate a mixture of a first coarse aggregate, such as sand or gravel, having a sieve particle size of from 300 to 3000 micron and a second coarse aggregate having a sieve particle size of from 2000 micron to 18 mm, such as gravel or stone, wherein the ratio of the sieve particle size of the second coarse aggregate to the sieve particle size of the first coarse aggregate ranges from 15:1 to 1.5:1, or, preferably, from 10:1 to 2:1.

In accordance with the granular wet cement compositions of the second aspect of the present invention, the wet cement compositions may comprise the mixture of a two-component composition, wherein the first component comprises the dry mix compositions and the second component comprises water, wherein either the first component or the second component comprises the one or more cellulose ethers in the amount as stated for the dry mix compositions and, if used, any of the one or more superplasticizers in the amount as stated for the dry mix compositions.

The granular wet cement compositions in accordance with the second aspect of the present invention my further comprise one or more superplasticizers chosen from a polycarboxylate ether containing, naphthalene sulfonate containing, lignosulfonate containing superplasticizers, or mixtures thereof.

In the granular wet cement compositions in accordance with the second aspect of the present invention, the superplasticizers may be used in amounts of from 0.1 to wt. % of polycarboxylate ethers, from 0.2 to 5.0 wt. % or from 0.3 to 1.0 wt. % of naphthalene sulfonate or lignosulfonate containing materials, preferably from 0.1 to 0.5 wt. % of polycarboxylate ethers, all amounts based on the total weight of the dry mix compositions.

The granular wet cement compositions in accordance with the second aspect of the present invention, comprising further the one or more superplasticizers chosen from a polycarboxylate ether, naphthalene sulfonate containing, lignosulfonate containing superplasticizers, or mixtures thereof as part of the first component as a dry mix composition.

The granular wet cement compositions in accordance with the second aspect of the present invention may further comprise, as part of the dry mix composition which is mixed with water, one or more superplasticizers chosen from a polycarboxylate ether containing, naphthalene sulfonate containing, lignosulfonate containing superplasticizers, or mixtures thereof.

Preferably, the granular wet cement compositions in accordance with the second aspect of the present invention have a slump as determined in accordance with ASTM C143 (2010) using a stainless steel cone height 80 mm, top diameter 40 mm, bottom diameter 90 mm, steel rod stirrer, preferably, of 9.5 mm diameter, 266.7 mm length, by mixing the dry mix compositions in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into the stainless-steel cone which has been dampened with water via a sponge and placed on a non-absorbent surface, filling each layer and mixing with the stainless steel rod in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm, of 6 mm or less or, more preferably, 4.5 mm or less.

More preferably, the wet cement compositions in accordance with the second aspect of the present invention have a lubricity of from 22° to 36.8° or less, or, preferably, from 26° to 36°, or 36.0° or less, determined as the angle of the slope of a yield curve of normal stress at which the compositions yield in shear testing plotted versus the normal stress (on the abscissa), wherein the normal stress is varied from 25% to 80% of a pre-shear normal stress in accordance with ASTM D6773-16 (2016), preferably, using an automated shear tester controlled by the software RSTCONTROL for MS Windows (Dietmar Schulze, Wolfenbuttel, DE), and using 50,000 Pa as the pre-shear normal stress and then reducing normal stress and measuring over a normal stress range of from 12,500 Pa to at least 40,000 Pa with a point spacing of 5 points per decade of % or pre-shear normal stress.

In a third aspect in accordance with the present invention, methods of making and using the granular wet cement compositions in accordance with the second aspect present invention comprise forming the granular wet cement composition by mixing water, hydraulic cement and graded aggregate to form a wet cement composition, adding thereto the cellulose ether composition and any superplasticizer(s) as a dry powder and mixing in a pump or a pug mill mixer to form the granular wet cement composition, applying the granular wet cement composition to a substrate without a mold or a form, and then paving or rolling the wet cement compositions to form a concrete or cement layer, such as a road or pavement. The paving or rolling may be carried out using a steam roller without the steam or using conventional asphalt paving equipment, preferably, in the absence of added heat.

In the methods of the third aspect of the present invention, granular wet cement compositions comprise water and a dry mix composition of:

hydraulic cement, for example, pozzolans, ordinary Portland cement, aluminate cement, fly ash, and their mixtures, in the amount of from 10 to 23 wt. % or, preferably, from 12 to 20 wt. %, based on the total weight of the dry mix composition, graded aggregate in the amount of from 70 to 89.95 wt. % or, preferably, in the amount of from 75 to 89.65 wt. %, based on the total weight of the dry mix composition comprising i) one or more coarse aggregates having a sieve particle size of from 200 microns to 20 mm, for example, sand, limestone, gravel, granite, or clay, or, preferably sand, or, more preferably, a combination of a first coarse aggregate and a second coarse aggregate wherein the first coarse aggregate has a sieve particle size of from 200 microns to 3000 microns and the second coarse aggregate has a sieve particle size of from 2000 microns to 20 mm wherein the ratio of the sieve particle size of the second coarse aggregate to that of the first coarse aggregate ranges from 15:1 to 1.5:1, or, preferably from 10:1 to 2:1, and ii) one or more fine aggregates, preferably limestone, having a sieve particle size of from 40 microns to less than 3000 microns or, preferably, from 70 microns to 3000 microns, a cellulose ether or a mix of two of more cellulose ethers in the amount of 0.05 to 1.3 wt. % or, preferably, from 0.08 to 1.1 wt. %, or, more preferably, from 0.08% to 0.35 wt. %, based on the total weight of the dry mix composition, wherein the cellulose ether or mix of two or more cellulose ethers has an aqueous solution viscosity at 1 wt. % cellulose ether solids, at 20° C., and a 514 s$^{-1}$ shear rate, as determined using a strain-controlled rotational rheometer (ARES-G2™, TA Instruments, New Castle, DE) equipped with a Peltier temperature controller, TRIOS™ data acquisition software (TA Instruments) and DIN sample fixtures comprising concentric cylinders, employing a strain rate sweep from 0.03 to 300/s at ten points/decade, and as expressed as the average of two trials for each cellulose ether, ranging from 50 to 650 mPa s, or, preferably, from 80 to 500 mPa s, the aqueous solution made by drying a powder of the cellulose ether overnight in a 70° C. vacuum oven, dispersing the powder into hot water at 70° C., allowing the particles to dissolve with stirring as the slurry cools to room temperature and refrigerating it overnight (4° C.) to form the aqueous solution; and, wherein the water is present in the amount of from 5.0 to 13 wt. %, or, preferably, from greater than 5 to 10.5 wt. %, based on the total weight of the granular wet cement composition;

further wherein, the wet cement composition has a water saturation level of less than 58%, as defined by the percentage of voids filled with wet cement, which is cement plus water, as expressed by the following equation:

$$\text{Water saturation} = (V_w + V_c)/V_v,$$

wherein $V_w$ is the volume of water in the wet cement composition, $V_c$ is the volume of cement $V_c = m_c/\rho_c$, where $m_c$ is the mass of cement in the wet cement composition and $\rho_c$ is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mixing well and pouring all of them into a container and calculating void volume $V_v = V - \Sigma(m_i/\rho_i)$;

still further wherein, the weight ratio of the total coarse aggregate to the total fine aggregate in the graded aggregate ranges from 4:1 to 0.9:1, or, preferably, from 3:1 to 1:1; and, yet still further wherein, all wt. % s in the dry mix composition add to 100%. Preferably, in accordance with the methods of applying the wet cement compositions of the third aspect of the present invention, the compositions comprise as the coarse aggregate in the graded aggregate a mixture of a lower sieve particle size material having a sieve particle size of from 200 microns to 3000 microns and a higher sieve particle size aggregate having a sieve particle size of from 500 microns to 20 mm, or, preferably, from 1.5 to 18 mm, such as sand or gravel.

The ratio of the sieve particle size of the total coarse aggregate to the sieve particle size of the fine aggregate in the wet cement compositions may range from 20:1 to 1.5:1 or, preferably, from 10:1 to 2:1.

In accordance with the methods of applying the wet cement compositions of the third aspect of the present invention, wherein the wet cement compositions comprise the mixture of a two-component composition, wherein the first component comprises the dry mix compositions, with or without the one or more cellulose ethers and, if used, any of the one or more superplasticizers, and the second component comprises water, wherein either the first component or the second component comprises the one or more cellulose ethers in the same amount as stated for the dry mix compositions, and, if used, any of the one or more superplasticizers in the same amount as stated for the dry mix compositions. In accordance with the methods of applying the wet cement compositions of the third aspect of the present invention, wherein the wet cement compositions further comprise, as part of the first component dry mix composition which is mixed with water as the second component, or as a solution or dispersion in water as the separate second component which is mixed with the dry mix composition as the first component, one or more superplasticizers chosen from a polycarboxylate ether, naphthalene sulfonate containing, lignosulfonate containing superplasticizers, or mixtures thereof.

In the methods of applying the wet cement compositions in accordance with the third aspect of the present invention, wherein in the wet cement compositions the superplasticizers, are used in amounts of from 0.1 to 0.5 wt. % of polycarboxylate ethers, from 0.2 to 5.0 wt. % or from 0.3 to 1.0 wt. % of naphthalene sulfonate or lignosulfonate containing materials, or, preferably from 0.1 to 0.5 wt. % of polycarboxylate ethers, all amounts based on the total weight of the dry mix composition.

Preferably, in accordance with the methods of applying the wet cement compositions of the third aspect of the present invention, wherein the wet cement compositions have a slump as determined in accordance with ASTM C143 (2010) using a stainless steel cone height 80 mm, top diameter 40 mm, bottom diameter 90 mm, steel rod stirrer, preferably of 9.5 mm diameter, 266.7 mm length, by mixing the dry mix compositions in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into the stainless-steel cone which has been dampened with water via a sponge and placed on a non-absorbent surface, filling each layer and mixing with the stainless steel rod in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm, of less than 6 mm, or, preferably, less than 4.5 mm.

More preferably, in accordance with the methods of applying the wet cement compositions of the third aspect of the present invention, the wet cement compositions have a lubricity of from 22° to 36.8° or less, or, preferably, from 26° to 36°, or from 36.0° or less, determined as the angle of the slope of a yield curve taken as the level of normal stress at which the compositions yield in shear testing plotted versus the normal stress (on the abscissa) at which the compositions are tested, wherein the normal stress is varied from 25% to 80% of the pre-shear normal stress in accordance with ASTM D6773-16 (2016), preferably, the Standard Test Method for Bulk Solids Using Schulze Ring Shear Tester using an automated shear tester controlled by the software RSTCONTROL 95 for MS Windows (Dietmar Schulze, Wolfenbuttel, DE), using 50,000 Pa as the pre-shear normal stress and then reducing normal stress and measuring over a normal stress range of from 12,500 Pa to at least 40,000 Pa with a point spacing of 5 points per decade of % of pre-shear normal stress.

The singular forms "a," "an," and "the" include plural referents unless the context clearly dictates otherwise. Unless defined otherwise, the terms used herein have the same meaning as is commonly understood by one skilled in the art.

Unless otherwise indicated, any term containing parentheses refers, alternatively, to the whole term as if no parentheses were present and the same term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of from 1.5:1 to 4.5:1 or, preferably, from 2:1 to 4:1, or, more preferably, from 2.5:1 to 3.7:1; means any or all of ranging from 1.5:1 to 4.5:1 or, from 1.5:1 to 2:1 or, from 1.5:1 to 2.5:1, or, from 1.5:1 to 3.7:1, or, from 1.5:1 to 4:1, or, from 2:1 to 4.5:1, or, preferably, from 2:1 to 2.5:1, or, preferably, from 2:1 to 3.7:1, or, preferably, from 2:1 to 4:1, or, preferably, from 2.5:1 to 4:1, or, more preferably, from 2.5:1 to 3.7:1.

Unless otherwise indicated, conditions of temperature and pressure are room temperature (23° C.) and standard pressure (101.3 kPa), also referred to as "ambient conditions".

And, unless otherwise indicated, all conditions include a relative humidity (RH) of 50%.

All ranges recited are inclusive and combinable. For example, a disclosure of from 0.25 to 0.5 wt. %, or, preferably, from 0.35 to 0.45 wt. %, will include all of from 0.25 to 0.5 wt. %, or, preferably, from 0.35 to 0.45 wt. %, or, from 0.25 to 0.35 wt. %, or, from 0.25 to 0.45 wt. %, or, from 0.35 to 0.5 wt. %, or, from 0.45 to 0.5 wt. %.

As used herein, the term "acrylic or vinyl" refers to addition polymerizable monomers or addition polymers of a, 8-ethylenically unsaturated monomers, such as, for example, alkyl and hydroxyalkyl (meth)acrylates, vinyl ethers, ethylenically unsaturated carboxylic acids, alkyl (meth)acrylamides, or oxyalkylene chain group containing monomers, such as, for example, methoxy poly(ethylene glycol) (meth)acrylate (mPEG(M)A) or poly(ethylene glycol) (meth)acrylate (PEG(M)A) and allyl poly(ethylene glycol) (APEG).

As used herein the term "aqueous" means that the continuous phase or medium is water and from 0 to 10 wt. %, based on the weight of the medium, of water-miscible compound(s). Preferably, "aqueous" means water.

As used herein, the term "ASTM" refers to publications of ASTM International, West Conshohocken, PA.

As used herein, the term "hydraulic cement" includes substances which set and harden in the presence of water such as Portland cement, silicate-containing cements, aluminate-based or aluminous cements, pozzolanic cements and composite cements.

As used herein the term "dry mix" or "dry powder" means a storage stable powder containing cement, cellulose ether, any other polymeric additive, and any fillers and dry additives. No water is present in a dry mix; hence it is storage stable.

As used herein the term "DS" is the mean number of alkyl substituted OH-groups per anhydroglucose unit in a cellulose ether . . . the term "MS" is the mean number of hydroxyalkyl substituted OH-groups per anhydroglucose unit, as determined by the Zeisel method. The term "Zeisel method" refers to the Zeisel Cleavage procedure for determination of MS and DS, see G. Bartelmus and R. Ketterer, Fresenius Zeitschrift fuer Analytische Chemie, Vol. 286 (1977, Springer, Berlin, DE), pages 161 to 190.

As used herein, the term "lubricity" refers to the slope of a yield curve, expressed as an angle of the linearized yield locus plot measured by shear testing in accordance with ASTM D6773-16 (Standard Test Method for Bulk Solids Using Schulze Ring Shear Tester, 2016) using an automated shear tester controlled by the software RSTCONTROL 95 for MS Windows (Dietmar Schulze, Wolfenbuttel, DE), with 50,000 Pa as the given pre-shear stress. Lubricity measures the ability of particles to move against one another under shear and a lower relative normal force and a lower slope is better. In other words, a lower "internal friction" angle means higher lubricity, as internal friction is the ratio of the maximum internal shear force that resists movement between the particles of a material to a normal force (compaction) between the particles, or the resistance of the particles to moving against each other under compaction and shear.

As used herein, the term "overnight" means a period of from 10 to 14 hours.

As used herein, the term "paste" refers to mixtures comprised of a hydraulic cement and water; the paste excludes the aggregates.

As used herein, unless otherwise indicated, the phrase "polymer" includes both homopolymers and copolymers from two or more than two differing monomers, as well as segmented and block copolymers.

As used herein, the term "sieve particle size" of a material refers to a particle size as determined by sieving the material through successively smaller size mesh sieves until at least 10 wt. % of the material is retained on a given sieve and recording the size of the sieve that is one sieve size larger than the first sieve which retains at least 10 wt. % of the material.

As used herein the term "sieve particle size of total coarse aggregate" for a mixture of coarse aggregates means the weighted average of the sieve particle sizes of all coarse aggregates in the mixture. For example, the sieve particle size of a 50:50 w/w mix of a 1 mm sieve particle size coarse aggregate and a 10 mm sieve particle size coarse aggregate is (1 mm×0.5)+(10 mm×0.5) or 5.5 mm.

As used herein, the term "slump" refers to the lateral or downward flow of a standing sample of a wet cement composition over a given time period that can be measured in several ways.

As used herein, the term "storage stable" means that, for a given powder additive composition, the powder will not block and, for a given aqueous composition, the liquid composition will not become cloudy, separate or precipitate after 5 days, or, preferably, 10 days when allowed to stand on a shelf under room temperature conditions and standard pressure.

As used herein, the phrase "total solids", "solids" or "as solids" refers to total amounts of any or all of the non-volatile ingredients or materials present in a given composition, including synthetic polymers, monomers, natural polymers, acids, defoamers, hydraulic cement, fillers, inorganic materials, and other non-volatile materials and additives, such as initiators. Water, ammonia and volatile solvents are not considered solids.

As used herein, the term "water saturation" refers to the result given by the equation Water Saturation=$(V_w+V_c)/V_v$, wherein $V_w$ is the volume of water in the wet cement composition, $V_c$ is the volume of cement $V_c$=$mc/\rho c$, where $m_c$ is the mass of cement in the wet cement composition and $\rho c$ is the material density of the cement, and $V_v$ is the total void volume in the total mixture determined by measuring the particle density of each material other than cement and water, $\rho_i$, measuring the total mass of each material other than cement and water, $m_i$, measuring the total volume of all materials other than cement and water, V, by mix well and pouring all of them into a container and calculating "void volume" $V_v$=$V-\Sigma(m_i/\rho_i)$. The void volume also is referred to as voidage or inter-particle porosity $\epsilon$=$[V-\Sigma(m_i/\rho_i)]/V$ and is the converse of the "packing fraction", which is given by $1-\epsilon$. As used herein, unless otherwise indicated, the term "wt. %" means weight percent based on the indicated denominator.

In accordance with the present invention, the present inventors have discovered a granular hydraulic cement composition that behaves like asphalt compositions using a low viscosity cellulose ether in the cement admixture. The granular wet cement compositions in accordance with the present invention are slightly undersaturated in water and appear and behave like dirt as they do not pack or settle under their own weight. Likewise, the wet cement compositions formed by mixing the dry mix compositions in accordance with the present invention with water and, optionally, admixtures including the cellulose ethers, do not pack or settle under their own weight. The compositions of the present invention enable paving via "compaction" or volumetric compression without the loss of any wet cement materials to achieve the highest strength. The compositions provide viscosity to slow consolidation, or loss of water and cement, from the mass relative to compaction. In addition, the compositions enable enhanced lubricity in the formulation, which facilitates the aggregate particle movement needed to compact the pavement, densify, and remove the air voids to achieve optimal strength. In particular, the present inventors have found that in roller compacted concrete (RCC), a lower viscosity cellulose ether or mixture thereof (ranging from 50 to 750 mPa·s for 1 wt. % cellulose ether solids, at 20° C., and a 514 s$^{-1}$ shear rate, ARES-G2™ strain-controlled rotational rheometer, TA Instruments, New Castle, DE, employing a strain rate sweep from 0.03 to 300/s at ten points/decade), surprisingly improves compaction and thus concrete strength, especially with 10.5 wt. % or less of water, based on the weight of granular wet cement compositions to which the water is added to make the RCC. In the wet cement compositions in accordance with the present invention, the viscosity of the interstitial aqueous phase measured at 20° C. and at 514 s$^{-1}$ achieves optimal strength and compaction. Further, when the aqueous phase lies in this low viscosity range, the variation in useful amounts of cellulose ethers can be increased for ease of formulation.

Because the admixtures are added volumetrically in the field for RCC mixtures, and not by mass, it is critically important to have formulation latitude for over- and under-dosed admixtures for RCC. Whereas RCC mixes were too sensitive to high viscosity cellulose ether grades, where changes in fractions of a percent could lower the strength of the RCC mixture, and therefore it was impractical to use in the field. We found that the lower viscosity grades of cellulose ethers enabled the needed formulation latitude required to produce reliably compactible or payable RCC mixes.

In accordance with the present invention, the lubricity improved by the water soluble cellulose ether of the present invention is insensitive to aggregate material particle size, sphericity, and roughness. This is surprising as, when compared to conventional concrete, RCC has a higher volume of aggregate, and a lower level of cement and water than conventional concrete. While such formulation differences result in a zero slump or nearly zero slump pavement, on the other hand, the high aggregate and low water content in the formulation also causes RCC to be very resistant to compaction, making the product rougher relative to traditional concrete pavements. Known viscosity modifying additives (VMAs, such as polyvinyl alcohol) that were developed for concrete and used in RCC today fail to lower yield strength (the force needed to cause the mix to yield or compact), and improve lubricity. Rather, using known commercially available VMAs to attain the optimized viscosity to avoid consolidation would require unrealistically high use levels of the VMA in the RCC wet cement compositions.

Further, the lubricity and strength of products from roller compacting cementitious compositions can be further improved by combining the cellulose ether with superplasticizers. Adding superplasticizers, including polycarboxylate ether, lignosulfonate, and naphthalene sulfonate containing plasticizers can further improve the yield strength and viscosity of the RCC concrete and wet cement compositions for making them. Use of too much superplasticizer may detrimentally effect yield strength when combined with cellulose ethers, while too little does not change the strength or lubricity of concrete made from the wet cement compositions containing them. Therefore, in accordance with the present invention, a combination of generally less than 1 wt. % superplasticizer with the cellulose ether in a total amount of 2.5 wt. % or less or, preferably, 2 wt. % or less, based on the total weight of the wet cement compositions can yield the best results for RCC pavement compaction and strength.

In accordance with the present invention, dry mix compositions and wet cementitious formulations include cellulose ethers, granular materials, hydraulic binders or cements, and optionally other chemical admixtures. Wet cement compositions comprise dry mix compositions mixed with water in the amount of from 5.0 to 13.0 wt. %, or, preferably, from greater than 5.0 to 10.5 wt. %, based on the total weight of the granular wet cement composition, and optionally admixtures supplementary cementitious materials (SCMs). As the particle size of the graded aggregate and, especially, the coarse aggregate increase, water demand decreases. So, for example, where the coarse aggregate has a sieve particle size of 5 mm or larger, or 6 mm or larger, suitable amounts of water range from 5 to 6.5 wt. %, based on the total weight of the granular wet cement composition.

The one or more cellulose ethers in accordance with the present invention comprise a low viscosity cellulose ether. The one or more cellulose ethers may comprise part of a dry mix composition, or they may comprise part of a solution or dispersion in water as the second component of a two-component composition wherein the first component comprises the dry mix composition (without the cellulose ether). At least one of the one or more cellulose ethers has a side chain chosen from hydroxyethyl, hydroxypropyl, methyl, and combinations thereof, or, preferably, hydroxyethyl and methyl. Accordingly, the most preferred low viscosity cellulose ether comprises hydroxyethyl methyl cellulose.

In the low molecular weight cellulose ethers of the present invention, alkyl substitution is described in cellulose ether chemistry by the term "DS". The DS is the mean number of substituted OH groups per anhydroglucose unit. The methyl substitution may be reported, for example, as DS (methyl) or DS (M). The hydroxy alkyl substitution is described by the term "MS". The MS is the mean number of moles of etherification reagent which are bound as ether per mol of anhydroglucose unit. Etherification with the etherification reagent ethylene oxide is reported, for example, as MS (hydroxyethyl) or MS (HE). Etherification with the etherification reagent propylene oxide is correspondingly reported as MS (hydroxypropyl) or MS (HP). The side groups are determined using the Zeisel method (reference: G. Bartelmus and R. Ketterer, Fresenius *Zeitschrift fuer Analytische Chemie* 286 (1977), 161-190).

In accordance with the present invention, the one or more cements refers to any hydraulic cement that sets and hardens in the presence of water. Suitable non-limiting examples of hydraulic cements include Portland cement, hydraulic hydrated lime, aluminate cements, such as calcium aluminate cement, calcium sulfoaluminate cement, calcium sulfate hemi-hydrate cement; pozzolans, which are siliceous or aluminosiliceous material with slaked lime that in finely divided form in the presence of water, chemically react with the calcium hydroxide released by the hydration of Portland cement to form materials with cementitious properties, such as diatomaceous earth, opaline cherts, clays, shales, fly ash, silica fume, volcanic tuffs and pumicites, for example, volcanic ash mixed with slaked lime; refractory cements, such as ground granulated blast furnace slag; magnesia cements, such as magnesium phosphate cement, magnesium potassium phosphate cement, and mixtures thereof. Portland cement, as used in the trade, means a hydraulic cement produced by pulverizing and calcining together a clinker, comprising of hydraulic calcium silicates, calcium aluminates, and calcium ferroaluminates, with one or more of the forms of calcium sulfate in an intergrind addition. Portland cements according to ASTM C150 are classified as types I, II, Ill, IV, or V.

Granular materials include but are not limited to sand, limestone, gravel, granite, and clay and comprise a graded aggregate of at least one coarse aggregate and at least one fine aggregate. Smaller fine aggregate particles mixed with larger coarse aggregate particles, such as compositions with more than one particle size distribution, reduce void volume and thereby reduce cement demand, and enable improved packing and thus higher strength with less water added at a constant water-to-cement ratio. Suitable fine aggregates are materials that have a sieve particle size of, for example, less than 3000 microns, such as limestone, finely divided silica, talc, fillers, or pigments. Suitable coarse aggregates have a sieve particle size of 2000 microns or larger. Such as silica, quartz, crushed round marble, glass spheres, granite, coarse limestone, calcite, feldspar, alluvial sands, or any other durable aggregate natural or manufactured sand, and mixtures thereof.

Admixtures include but are not limited to plasticizers, superplasticizers, retarders, accelerators, defoamers, and viscosity modifying additives. Admixtures comprise additives. The compositions of the present invention can contain, in addition, conventional additives in wet or dry form, such as, for example, cement setting accelerators and retarders, air entrainment agents or defoamers, shrinking agents and wetting agents; surfactants, particularly nonionic surfactants; mineral oil dust suppressing agents; biocides; plasticizers; organosilanes; anti-foaming agents such as poly (dimethylpolysiloxanes) (PDMS) and emulsified PDMS, silicone oils and ethoxylated nonionics; and coupling agents such as, epoxy silanes, vinyl silanes and hydrophobic silanes.

EXAMPLES

The following examples illustrate the present invention. Unless otherwise indicated, all parts and percentages are by weight and all temperatures are in ° C. and all preparations and test procedures are carried out at ambient conditions of room temperature (23° C.) and pressure (1 atm). In the examples and Tables 1, 2, and 3 that follow, the following abbreviations were used: CE: cellulose ether; MPEG: Methoxypoly(ethylene glycol); MAA: Methacrylic acid; AA: Acrylic acid; MMA: Methyl methacrylate; PEO: Poly (ethylene oxide).

The following materials were used in the Examples that follow (All components were used as received):

Silica sand: Sieve particle size of 300 micron (Fairmount Minerals 730, Fairmount Minerals LLC, Oklahoma City, OK);

Crushed limestone: $CaCO_3$, Sieve particle size 44 microns (MICRO-WHITE™ 100, Nagase Specialty Materials NA LLC, Itasca, IL);

Manufactured sand: 6 mm sieve particle size;

Portland cement: Type 1 Portland cement);

water (deionized);

Cellulose ether 1: Hydroxyethyl methylcellulose (HEMC), WALOCEL™ MW 15000 PFV cellulose ether, The Dow Chemical Co., Midland, MI (Dow), MS=0.17, DS=1.40);

Cellulose ether 2: HEMC (WALOCEL™ M-20678 cellulose ether, Dow, MS=0.32, DS=1.73);

Cellulose ether 3: Hydroxyethyl cellulose, CELLO-SIZE™ QP 15000H cellulose ether, Dow, MS=2.0, DS=0;

15                                                                                  16

Cellulose ether 4: HEMC, WALOCEL™ MT 30000 cellulose ether, Dow, MS=0.40, DS=1.85);

Cellulose ether 5: Hydroxypropyl Methyl Cellulose, METHOCEL™ 240S cellulose ether, DuPont, Wilmington, DE, MS=0.15, DS=1.81;

Cellulose ether 6: HEMC, WALOCEL™ MT 10000 cellulose ether, Dow, MS=0.40, DS=1.85;

Cellulose Ether 7: HEMC WALOCEL™ MKW 15000 cellulose ether, MS=0.22, DS=1.64;

Cellulose Ether 8: HEMC WALOCEL™ MKX 15000 cellulose ether MS=0.258, DS=1.60;

Viscosity modifier A: Diutan Gum natural high-molecular-weight gum produced by aerobic fermentation; KELCOCRETE™ DG-F gum, Cp Kelco Co., Atlanta, GA;

Viscosity modifier B: aqueous solution of vinyl alcohol/vinyl acetate copolymer V-MAR™ F100 polymer, WR Grace GCP Applied Technologies, Chicago, IL (Grace);

Viscosity modifier C: Blend of sodium gluconate water reducer and polyacrylic acid carboxylate viscosity modifier, V-MAR™ VSC500, Grace Superplasticizer 1: Polyaromatic (quinoline) sulfonate water reducer VISCTROL™, Euclid Chemical Co, Easton, PA (Euclid);

Superplasticizer 2: MELFLUX™ 2651 F polycarboxylate ether, BASF, Ludwigshafen, DE;

Superplasticizer 3: Sodium or calcium lignosulfonate water reducer, Eucon LR, Euclid;

Superplasticizer 4: Aqueous poly(AA/MPEG) comb polymer esterification product of 200 g of 2000 MW MPEG (MPEG 2000) and 44.2 g of an aqueous poly(acrylic acid) containing sodium hypophosphite at 50 wt. % solids with a pH=3 and a viscosity of 500 mPa·s as measured by Brookfield Viscometer using #2 spindle at 30 rpm, 25° C.;

Superplasticizer 5: Sodium or calcium naphthalene sulfonate water reducer (TAMOL™ SN, Dow).

PEO: CarboWax™ Polyethylene Glycol 400 (380-420 g/mol), Dow.

TABLE A

| Viscosities of 1 wt. % Aqueous Cellulose Ethers or Viscosity Modifiers at 20° C. | |
| --- | --- |
| Cellulose ether or Comparative | $\eta(514\ s^{-1})$, mPa·s |
| 1 | 137 |
| 2 | 302 |
| 3 | 132 |
| 4 | 194 |
| 5 | 190 |
| 6 | 129 |
| 7 | 143 |
| 8 | 139 |
| Viscosity modifier A* | 74 |
| Viscosity modifier B* | 1.1 |
| Viscosity modifier C* | 1.3 |
| Water* | 1.0 |

*—Denotes Comparative Example.

To measure the viscosity in Table A, above, the cellulose ether powders were dried overnight in a 70° C. vacuum oven prior to use. Otherwise, all viscosity modifiers were used as received at a 1 wt. % solids content in deionized water. Cellulose ether solutions were prepared for testing at 1 wt. % solids by drying the powder, dispersing the powder into hot water at 70° C., followed by allowing to dissolve with stirring while cooling to room temperature and refrigerating overnight (4° C.). Viscosity was measured using a strain-controlled rotational rheometer (ARES-G2™, TA Instruments, New Castle, DE), equipped with a Peltier temperature controller, TRIOS™ data acquisition software (TA Instruments) and DIN sample fixtures comprising concentric cylinders except in the case of Viscosity modifiers B and C, where the DIN sample fixtures were replaced with double-wall concentric cylinder sample fixtures. Two trials were run for each sample, with the average of the two reported.

The following formulation method was used in the examples that follow:

Dry Mix and Wet cement Preparation: The indicated sand, limestone, cement, cellulosic ether, and superplasticizer in all of Tables 1A, 1B, 1C, 1D, 1E and 1F were dry mixed in a plastic bag for two minutes, and then added to the water in a mixing bowl (Hobart N50 Mixer, Hobart Corp., Troy, OH). Each formulation was mixed at a low rotation rate (136 RPM) for 15 seconds, while mixing bowl sides were scraped off and returned to the bowl bottom. The formulations were mixed at the same rotation rate again. In all tests, the wet cement compositions were tested within 10 min. after preparation. All compositions totaled 800 g powder solids, where 800 g is 100% of the total parts of dry powder. Water wt. % is based on the total formulation (granular wet cement) weight, which includes powder solids and water.

TABLE 1A

| Comparative Formulation 1 Without Cellulose Ether and Superplasticizer | |
| --- | --- |
| Material | Wt. % |
| Portland | 15.0 |
| Silica sand | 65.0 |
| Crushed limestone | 20.0 |
| Total Parts of Dry Powder | 100.0 |
| Water to powder ratio | 0.135:1 |
| Water fraction of total sample | 11.89% |

TABLE 1B

| Formulation 2 With Cellulose Ether at 54% Water Saturation | |
| --- | --- |
| Material | Wt. % |
| Portland Cement | 15.0 |
| Silica sand | 65.0 |
| Crushed limestone | 20.0 |
| Cellulose ether (See Tables 2, 3, 4 and 5) | variable |
| Total Parts of Dry Powder | 100.0 |
| Water to powder ratio | 0.135:1 |
| Water fraction of total sample | 11.89% |

TABLE 1C

| Comparative Formulation 3 With Cellulose Ether and 56% Water Saturation | |
| --- | --- |
| Material | Wt. % |
| Portland Cement | 15.0 |
| Silica sand | 65.0 |
| Crushed limestone | 20.0 |
| Cellulose ether (See Tables 2, 3, 4 and 5) | variable |
| Total Parts of Dry Powder | 100.0 |
| Water to powder ratio | 0.142:1 |
| Water fraction of total sample | 12.4% |

TABLE 1D

| Formulation 4 With 0.1 to 0.25% Cellulose ether and 56% Water Saturation | |
| --- | --- |
| Material | Wt % |
| Portland Cement | 15.0 |
| Silica sand | 64.75 |
| Crushed limestone 100 | 20.0 |
| Cellulose ether (See Tables 2, 3, 4 and 5) | variable |
| Total Parts of Dry Powder | 100.0 |
| Water to powder ratio | 0.142:1 |
| Water fraction of total sample | 12.4% |

TABLE 1E

| Comparative Formulation 5 With 0.15% Cellulose Ether And 56% Water Saturation | |
| --- | --- |
| Material | Wt % |
| Portland Cement | 15.0 |
| Silica sand | 64.85 |
| Crushed limestone | 20.0 |
| Cellulose ether (See Tables 2, 3, 4 and 5) | 0.150 |
| Superplasticizer | 0 |
| Total Parts of Dry Powder | 100.0 |
| Water to powder ratio | 0.142:1 |
| Water fraction of total sample | 12.4% |

TABLE 1F[1]

| Formulation 6 With Superplasticizer and Cellulose Ether or Viscosity Modifier | |
| --- | --- |
| Material | Wt % |
| Portland Cement | 15.0 |
| Silica sand | 64.775 |
| Crushed limestone | 20.0 |
| Cellulose ether (See Tables 2, 3, 4 and 5) | 0.150 |
| Superplasticizer | 0.075 |
| Total Parts of Dry Powder | 100.000 |
| Water to powder ratio | 0.142:1 |
| Water fraction of total sample | 12.4% |

[1]In Table 1F, inventive compositions comprise cellulose ether and comparatives do not.

TABLE 1G

| Formulation 7 With 0.15% Cellulose Ether On Formulation Solids | |
| --- | --- |
| Material | Wt % |
| Portland Cement | 15.0 |
| Silica sand | 64.85 |
| Crushed limestone | 20.0 |
| Cellulose ether 1 | 0.15 |
| Total Parts of Dry Powder | 100.000 |
| Water to powder ratio | 0.142:1 |
| Water fraction of total sample | 12.4% |

TABLE 1H

| Formulation 8 With Superplasticizer and 0.15% Cellulose Ether On Formulation Solids | |
| --- | --- |
| Material | Wt % |
| Portland Cement | 15.0 |
| Silica sand | 64.775 |
| Crushed limestone | 20.0 |
| Cellulose ether 1 | 0.15 |
| Superplasticizer 2 | 0.075 |
| Total Parts of Dry Powder | 100.000 |
| Water to powder ratio | 0.142:1 |
| Water fraction of total sample | 12.4% |

Test Methods: The following test methods were used in the examples that follow:

Water Saturation: Defined as the percent void volume that is filled with a cement paste. A cement paste includes both the cement and water volume fractions but excludes graded aggregate. Water Saturation is given by the equation $$\text{Water Saturation} = (V_w + V_c)/V_v,$$

wherein $V_w$ is the volume of water in the wet cement composition, $V_c$ is the volume of cement $V_c = m_c/\rho_c$, where $m_c$ is the mass of cement in the wet cement composition and pc is the material density of the cement, and $V_v$ is the total void volume in the total mixture determined by measuring the particle density of each material other than cement and water, $\rho_i$. The mass of each material, $m_i$, other than cement and water was measured. The density of each material other than cement and water, $\rho_i$, was determined by pouring each material into a graduated container to measure its volume. The volume of water, $V_w$, was measured by pouring it into a graduated container. The mass of water, mw, was recorded. Likewise, the density and mass of the cement $\rho_i$, and $m_i$, was measured. From this, "void volume" $V_v = V - \Sigma(m_i/\rho_i)$ was calculated. The void volume also is referred to as voidage or inter-particle porosity $\epsilon = [V - \Sigma(m_i/\rho_i)]/V$ and is the converse of the "packing fraction", which is given by 1−$\epsilon$. To measure Water Saturation, the volume $V_w$ of the indicated amount of water the volume of dry cement, $V_c$, as well as the mass and density of the cement were measured. Cement volume was recorded as $V_c = m_c/\rho_c$, where $m_c$ is the mass of cement in the sample and $\rho_c$ is the material density of the cement. Water saturation = $(V_w + V_c)/V_v$. To measure Water Saturation in a wet cement composition, a dry mixture of sand and aggregates, not including cement and water, was prepared and the dry volume, V of the given mixture was measured by pouring each into a graduated container. Then, the indicated wet cement composition was formed and the void volume determined.

Ring Shear Testing: Shear testing was performed in accordance with ASTM D6773-16 (Standard Test Method for Bulk Solids Using Schulze Ring Shear Tester, 2016). An automated shear ring tester, controlled by the software RSTCONTROL 95 for MS Windows (Dietmar Schulze, Wolfenbuttel, DE), was used to measure parameters with 50,000 Pa as the given pre-shear stress. The indicated wet cement composition samples were loaded into an annular test cell after being slaked for 10 minutes. Each sample weight was recorded. The test cell was then placed into the ring shear tester and the ring shear testing program was initiated. Three parameters were measured to quantify properties of the wet cement compositions: Unconfined yield strength, cohesion, and internal friction angle. Un-confined yield strength or Yield Strength quantifies the strength of a bulk solid under a level of compaction or consolidation in unconfined state (no confining side walls) and was determined as the stress level (normal) that caused the wet cement composition in an unconfined (unsupported) state to yield in response to shear. Internal friction angle (Lubricity), or the ability of particles in the composition to move against one another under shear, was determined as the slope of a yield curve measured by shear testing. Internal friction equals the resistance of the particles to moving against each other under compaction and shear and is the ratio of the maximum internal shear force that resists the movement of the particles to the normal force between the particles. Lubricity was determined as the slope of a yield curve measured by the ring shear tester, wherein the curve plots the maximum internal shear at which the particles resist movement versus normal stress at which the composition is exposed to normal compaction. Lower internal friction means higher lubricity. Cohesion determines the strength of the wet cement compositions when external forces are not applied and quantifies the attractive forces between particles.

Wet Cement Composition Extrusion: A strain-controlled capillary rheometer was set up to characterize extrusion performance at end-use conditions. The rheometer comprised a vertically-mounted testing frame (INSTRON model 5985 Instron, Norwood, MA) equipped with BLUEHILL3 data acquisition software (INSTRON), a 250-kN load cell mounted below the crosshead, a clevis pin (rated at 100 kN) connecting the load cell to a cylindrical metal piston (44.45 mm diameter), a stationary metal cylindrical barrel (200-mm length, 44.45 mm diameter) anchored to the lower test-frame table is designed to guide the downward motion of the piston (44.45 mm diameter), a conical transition from the barrel to the lower attached metal capillary (12.7 mm diameter, 50.8 mm length). The setup was placed in a constant temperature/humidity room (23° C. (73° F.), 50% humidity). The metal cylindrical barrel was hand filled with 300 grams of the indicated freshly-prepared wet cement compositions, and the compositions were pushed downward by the piston from the barrel into the capillary, and ultimately exited the capillary as a paste extrudate. A slow piston velocity (20 mm/min) was applied until a force F of 0.2 kN was achieved, and then the velocity was elevated to 500 mm/minute for the rest of the extrusion. The load-cell force F was measured as a function of piston displacement D. The piston displacement sometimes stopped before maximum displacement (160 mm) when the load cell approached its upper force limit (90 kN). Steady-state flow was identified when the extrusion force F measured by the load cell became insensitive to piston displacement D. The average force at a displacement of 100 mm (F at D=100 mm) was recorded as steady-state force $F_{SS}$. Extrusions at 500 mm/min were completed in 9 to 20 seconds. The extrusion stress or $\sigma$ was reported as the force F divided by the capillary cross-sectional area A, and was calculated, as follows: $\sigma$ (MPa)= $(F[N]/\{\pi\cdot(D_{die}[m]/2)^2\})\cdot(10^{-6}$ MPa/Pa), with $D_{die}[m]=0.50$ inch/39.3700787 inch/M=0.0127 M. The extrusion shear strain rate d$\gamma$/dt at the capillary wall (d$\gamma$/dt)=32Q/[$\pi\cdot$ $(D_{die})^3$=514/s is based on the paste volume rate Q of flow (Q=$v_{piston}\cdot\pi\cdot(D_{die}[m]/2)^2$), the capillary diameter $D_{die}[m]$, and the piston velocity ($v_{piston}$). The shear viscosity $\eta$ (Pa·s) at the capillary wall is defined as the ratio of the extrusion stress $\sigma$ and the shear strain rate d$\gamma$/dt (514 s$^{-1}$) at the capillary wall.

Rheology of Wet Cement Composition: Rheological data was measured at 20.0° C. with a stress-controlled rotational rheometer (AR-G2, TA Instruments, New Castle, DE) equipped with a Peltier temperature controller and using RHEOLOGY ADVANTAGE™ data acquisition software (TA Instruments, v5.5.24). Materials were sheared via rotation of a four-vaned stainless-steel rotor within a stainless-steel cup having an inside radius of 15.00 mm. The vane had an outside radius of 14.00 mm. The cup was filled to 42.00 mm immersed height. Approximate sample volume was 28.72 mL. Expressions used to translate transducer data into rheology were associated with DIN concentric-cylinder fixtures, so the rheology data were labelled as apparent rheology. Wet cement compositions were studied immediately after their preparation in a Hobart mixer. First, the recovery of the composition from flow in the Hobart mixer was monitored for 15 minutes with a time-resolved small-amplitude oscillatory shear flow (angular oscillation frequency of 1 rad/s, stress amplitude in the linear viscoelastic regime). The yield stress ($\sigma\gamma$) of the recovered unconfined paste was determined with a stress amplitude sweep (1 to 5000 Pa, 25 points/decade). The yield stress was identified as the stress amplitude associated with the inflection point of the dependence of the magnitude of the complex shear modulus magnitude |G*| on the stress amplitude $\sigma_0$. The inflection point was determined quantitatively with a nonlinear fit of data on semi-log axes with a sigmoidal function. Three replicate studies were performed using a fresh wet cement composition aliqout for each replicate and the results were averaged.

Slump of wet cement composition: Slump was determined by mixing dry ingredients in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into a stainless steel cone (height 80 mm, top diameter 40 mm and bottom diameter 90 mm) which has been dampened with water via a spray bottle and placed on a non-absorbent surface, filling each layer and mixing with a steel rod in a circular motion, positioning the rod parallel to the sides of the cone and working to a vertical position to finish in the center, finishing the surface of the wet cement composition flush with the top of the cone, pulling the cone up and off of the wet cement composition and recording the slump by measuring the total height of the cone and reporting the difference in the measured height and the initial 80 mm height.

TABLE 2

| Cellulose Ether Ring Shear Testing of Wet Cement Compositions at 54% Water Saturation | | | | | | |
|---|---|---|---|---|---|---|
| Example | Formulation | Cellulose Ether (CE) | CE Level (wt. %) | Viscosity (Pa*s)[1] | Yield Strength (kPa) | Lubricity (°) |
| 1-1* | 1* | None | 0 | 0.001 | 34 | 39 |
| 1-2 | 2 | 1 | 0.1 | 0.3 | 46 | 36.8 |
| 1-3 | 2 | 1 | 0.2 | 4 | 55 | 36.4 |
| 1-4 | 2 | 7 | 0.2 | 4 | 57 | 36.6 |

TABLE 2-continued

Cellulose Ether Ring Shear Testing of Wet Cement Compositions at 54% Water Saturation

| Example | Formulation | Cellulose Ether (CE) | CE Level (wt. %) | Viscosity (Pa*s)[1] | Yield Strength (kPa) | Lubricity (°) |
|---|---|---|---|---|---|---|
| 1-5 | 2 | 8 | 0.2 | 4 | 49 | 36.0 |
| 1-6 | 2 | (50/50 blend of 4 and 6) | 0.2 | 4 | 46 | 36.9 |
| 1-7 | 2 | 1 | 0.3 | 21 | 56 | 32.4 |
| 1-8 | 2 | 1 | 0.35 | 40 | 53 | 31.8 |
| 1-9 | 2 | 2 | 0.05 | 0.11 | 46 | 39 |
| 1-10 | 2 | 2 | 0.1 | 1.44 | 55 | 36.6 |
| 1-11 | 2 | 2 | 0.2 | 22 | 57 | 33.4 |
| 1-12 | 2 | 5 | 0.1 | 0.8 | 54 | 36.7 |
| 1-13 | 2 | 5 | 0.2 | 8 | 58 | 34.1 |
| 1-14 | 2 | 5 | 0.3 | 30 | 54 | 30.4 |
| 1-15 | 2 | 3 | 0.2 | 8 | 45 | 36.6 |
| 1-16* | 2* | Viscosity modifier A | 0.1 | 2 | 52 | 37.5 |
| 1-17* | 2* | Viscosity modifier A | 0.175 | 10 | 52 | 37.5 |
| 1-18* | 2* | Viscosity modifier A | 0.35 | 50 | 54 | 37.1 |
| 1-19* | 2* | Superplasticizer 1 | 0.2 | | 41 | 37.2 |
| 1-20* | 2* | Superplasticizer 1 | 0.7 | 1 | 41 | 36.4 |
| 1-21* | 2* | Viscosity modifier B | 0.075 | | 36 | 37.6 |
| 1-22* | 2* | Viscosity modifier B | 0.12 | | 37 | 37.1 |
| 1-23* | 2* | Viscosity modifier B | 0.25 | | 34 | 37.1 |
| 1-24* | 2* | Viscosity modifier C | 0.075 | | 32 | 37 |
| 1-25* | 2* | Viscosity modifier C | 0.15 | | 27 | 37.4 |
| 1-26* | 2* | Viscosity modifier C | 0.3 | | 27 | 36.9 |
| 1-27* | 2* | PEO | 0.5 | | 32 | 37.4 |
| 1-28* | 2* | PEO | 0.75 | | 33 | 38 |
| 1-29* | 2* | PEO | 1 | | 32 | 38 |

*Denotes Comparative Example;
[1]At 20.0° C. using a stress-controlled rotational rheometer (AR-G2, TA Instruments).

As shown in Table 2, above, only the inventive examples 1-2 through 1-15 exhibited acceptable yield strength of 45 kPa or more at an acceptably low angle of lubricity of less than 37 degrees. The inventive compositions thus are readily compacted without consolidating and provide sufficient yield strength to resist changing shape in the absence of compaction forces.

TABLE 3

Extrusion and Rheology Testing Data At 56% Water Saturation

| Example | Formulation | Cellulose Ether (CE) | Wt. % CE | Yield Stress $\sigma_Y$ (Pa) | Extrusion Force, kN | Extrudate Appearance |
|---|---|---|---|---|---|---|
| 2-1* | 3* | None | 0 | 770 | 83.2 | Wet, does not hold shape, force climbed to max and extrusion incomplete |
| 2-2 | 4 | 1 | 0.1 | 1,097 | 55.6 | Low dampness, holds shape, force held steady and climbed at end |
| 2-3 | 4 | 1 | 0.15 | 1,590 | 33.2 | No dampness, holds shape, force held steady |
| 2-4 | 4 | 1 | 0.2 | 983 | 25.7 | Low dampness, holds shape, force held steady |
| 2-5 | 4 | 1 | 0.25 | 960 | 20.4 | Low dampness, holds shape, force held steady |

*Denotes Comparative Example.

As shown in Table 3, above, the inventive wet cement compositions in Examples 2-2, 2-3, 2-4 and 2-5 with low viscosity cellulose ether all compacted without consolidation and were compacted to a point where force was no longer displaced.

TABLE 4

Extrusion and Oscillation Rheometry Testing Including Various Superplasticizers At 56% Water Saturation

| Example | Formulation | Cellulose Ether (wt. %) | SP (wt. %) | Yield Strength (kPa) | Lubricity (°) | Yield Stress $\sigma_Y$ (Pa) | Extrusion Force kN and appearance |
|---|---|---|---|---|---|---|---|
| 3-1 | 5 | 1 (0.15%) | None | 51 | 36.9 | 1,590 | 33.2; No dampness, holds shape, force held steady |
| 3-2 | 6 | 1 (0.15%) | 2 (0.015) | 54 | 35.6 | 1,180 | 24.7; Low dampness, holds shape, force held steady |
| 3-3 | 6 | 1 (0.15%) | 2 (0.0375) | 51 | 29.5 | 850 | 13.6; Low dampness, holds shape, force held steady |
| 3-4 | 6 | 1 (0.15%) | 2 (0.075) | 33 | 22.4 | 226 | 2.8; Medium dampness, trouble holding shape, force held steady |
| 3-5 | 6 | 1 (0.15%) | 4 (0.015) | 56 | 36.4 | — | — |
| 3-6 | 6 | 1 (0.15%) | 4 (0.0375) | 56 | 35.6 | — | — |
| 3-7 | 6 | 1 (0.15%) | 4 (0.075) | 57 | 32.5 | — | — |
| 3-8* | 6 | Viscosity modifier A (0.15%) | 4 (0.015) | 51 | 37.4 | — | — |
| 3-9* | 6 | Viscosity modifier A (0.15%) | 4 (0.0375) | 49 | 37.4 | — | — |

TABLE 4-continued

| | | Cellulose Ether (wt. %) | SP (wt. %) | Yield Strength (kPa) | Lubricity (°) | Yield Stress $\sigma_Y$ (Pa) | Extrusion Force kN |
|---|---|---|---|---|---|---|---|
| Example | Formulation | | | | | | and appearance |
| 3-10* | 6 | Viscosity modifier A (0.15%) | 4 (0.075) | 50 | 37.4 | — | — |

Extrusion and Oscillation Rheometry Testing Including Various Superplasticizers At 56% Water Saturation

*Denotes Comparative Example

As shown in Table 4, above, all inventive wet cement compositions 3-1 to 3-7 gave acceptable lubricity angles and yield strengths except for example 3-4, which had a 56 water saturation, a large amount of water, and had trouble compacting.

TABLE 5

Slump of Indicated Wet Cement Formulations

| Example | Formulation | Slump (mm) | Saturation % |
|---|---|---|---|
| 5-1* | 3 (CE = 0 wt. %) | 2.98 | 56 |
| 5-2 | 7 (CE 1 = 0.15 wt. %) | 1.37 | 56 |
| 5-3 | 8 (CE 1 = 0.15 wt. % + 0.015 SP wt. %) | 4.1 | 56 |
| 5-4* | 1 | 0 | 54 |
| 5-5 | 2 (CE 1 = 0.15 wt. %) | 0 | 54 |
| 5-6 | 8 (same as 5-3) | 0 | 54 |

*—Denotes Comparative Example.

As shown in Table 5, above, the slump, which is directly correlated to the yield stress of the mixture, is a sensitive function of the water saturation. At 54% water saturation all of Examples 5-4, 5-5 and 5-6 have yield stress above the critical limit for self-consolidation. At 56% water saturation despite the low viscosity of cellulose ether 1, the inventive composition of Example 5-2 enables limited or controlled slump relative to compositions not containing the cellulose ether in Comparative Example 5-1. Meanwhile, a superplasticizer increases the slump within reasonable limits.

We claim:

1. A granular wet cement composition from a dry mix composition and water comprising:

hydraulic cement in the amount of from 10 to 23 wt. %, based on the total weight of the dry mix composition, graded aggregate in the amount of from 70 to 89.95 wt. %, based on the total weight of the dry mix composition, comprising i) one or more coarse aggregates having a sieve particle size of from 200 microns to 20 mm, and ii) one or more fine aggregates having a sieve particle size of from 70 microns to less than 3000 microns, wherein the weight ratio of the i) total coarse aggregates to the ii) total fine aggregates in the graded aggregate ranges from 4:1 to 0.9:1, a cellulose ether or a mix of two or more cellulose ethers in the amount of from 0.05 to 1.3 wt. %, based on the total weight of the dry mix composition, wherein the cellulose ether or mix of two or more cellulose ethers have an aqueous solution viscosity at 1 wt. % cellulose ether solids, at 20° C., and a 514 $s^{-1}$ shear rate, as determined using a strain-controlled rotational rheometer, employing a strain rate sweep from 0.03 to 300/s at ten points/decade, and as expressed as the average of two trials for each cellulose ether, ranging from 50 to 750 mPa·s, wherein the aqueous solution was made by drying the cellulose ether powder overnight in a 70° C. vacuum oven, dispersing the powder into hot water at 70° C., allowing it to dissolve with stirring as it cools to room temperature and refrigerating it overnight at 4° C. to form the aqueous solution, and, water in the amount of from 5.0 to 13 wt. %, based on the total weight of the granular wet cement composition;

wherein the granular wet cement composition has a water saturation level of less than 58%, as defined by the percentage of voids filled with wet cement, which is cement plus water, as expressed by the following equation:

$$\text{Water saturation} = (V_w + V_c)/V_V,$$

wherein $V_w$ is the volume of water in the wet cement composition, $V_c$ is the volume of cement $V_c = m_c/\rho c$, where $m_c$ is the mass of cement in the wet cement composition and $\rho c$ is the material density of the cement, and $V_V$ is the total void volume in the total mixture determined by measuring the particle density of each material other than cement and water, $\rho_i$, measuring the total mass of each material other than cement and water, $m_i$, measuring the total volume of all materials other than cement and water, V, by pouring them into a container and mixing well, and then calculating void volume $V_v = V - \Sigma(m_i/\rho_i)$;

further wherein the granular wet cement composition has a slump as determined in accordance with ASTM C143 (2010) using a stainless steel cone height 80 mm, top diameter 40 mm, bottom diameter 90 mm, and a steel rod stirrer 9.5 mm diameter, 266.7 mm length by mixing the dry mix compositions in a plastic bag, adding the powder to the indicated amount of water in a Hobart mixing bowl, mixing twice on speed 1 for 15 s and stopping after mixing each time to scrape the sides of the bowl, slaking the mixture for 10 minutes and pouring the mixture in three equal layers into the stainless-steel cone which has been dampened with water via a sponge and placed on a non-absorbent surface, filling each layer and mixing with the stainless steel rod in a circular motion, positioning the rod parallel to the sides of the cone and working to a vertical position to finish in the center, finishing the surface of the wet cement composition flush with the top of the cone, pulling the cone up and off of the wet cement composition and recording the slump within 30 seconds by measuring the total height of the cone and reporting the difference in the measured height and 80 mm, of 6 mm or less; and, still further wherein, all wt. % s in the dry mix composition add to 100%.

2. The granular wet cement composition as claimed in claim 1, wherein the composition comprises water in the amount of from greater than 5.0 to 10.5 wt. %, based on the total weight of the granular wet cement composition.

3. The granular wet cement composition as claimed in claim 1, wherein the cellulose ether or mix of two or more cellulose ethers has an aqueous solution viscosity at 1 wt. % cellulose ether solids, at 20° C., and a 514 s$^{-1}$ shear rate, as determined using a strain-controlled rotational rheometer equipped with a Peltier temperature controller, TRIOS™ data acquisition software (TA Instruments) and DIN sample fixtures comprising concentric cylinders, employing a strain rate sweep from 0.03 to 300/s at ten points/decade, and as expressed as the average of two trials for each cellulose ether, ranging from 80 to 500 mPa·s, the aqueous solution made by drying the cellulose ether powder overnight in a 70° C. vacuum oven, dispersing it into hot water at 70° C., allowing it to dissolve with stirring as it cools to room temperature and refrigerating it overnight (4° C.) to form the aqueous solution.

4. The granular wet cement composition as claimed in claim 1, wherein the coarse aggregate in the graded aggregate comprises a mixture of a first coarse aggregate having a sieve particle size of from 300 to 2000 microns and a second coarse aggregate having a sieve particle size of from 2000 microns to 18 mm, and, further wherein, the ratio of the sieve particle size of the second coarse aggregate to the sieve particle size of the first coarse aggregate ranges from 15:1 to 1.5:1.

5. The granular wet cement composition as claimed in claim 1, further comprising one or more superplasticizers chosen from a polycarboxylate ether, naphthalene sulfonate containing, lignosulfonate containing superplasticizers, or mixtures thereof.

6. The granular wet cement compositions as claimed in claim 1 that has a slump as determined in accordance with ASTM C143 (2010), using a stainless steel cone of height 80 mm, top diameter 40 mm, bottom diameter 90 mm, and a steel rod stirrer of 9.5 mm diameter, 266.7 mm length, of 4.5 mm or less.

7. The granular wet cement composition as claimed in claim 1 having a lubricity of from 22° to 36.8° or less, determined as the angle of the slope of a yield curve taken as the level of normal stress at which the compositions yield in shear testing plotted versus the normal stress at which the compositions are tested, wherein the normal stress is varied from 25% to 80% of the pre-shear normal stress in accordance with ASTM D6773-16 (2016), using 50,000 Pa as the pre-shear normal stress and then reducing normal stress and measuring over a normal stress range of from 12,500 Pa to at least 40,000 Pa with a point spacing of 5 points per decade of % of pre-shear normal stress.

8. The granular wet cement composition as claimed in claim 7 having a lubricity of 36.0° or less.

9. The granular wet cement composition as claimed in claim 1, wherein at least one of the one or more cellulose ethers has a side chain chosen from hydroxyethyl, hydroxypropyl, methyl, and combinations thereof.

10. The granular wet cement composition as claimed in claim 9, wherein at least one of the one or more cellulose ethers is a hydroxyethyl methyl cellulose ether having a hydroxyethyl content (MS) ranging from 0 and 0.4, and a methoxyl content (DS) of from 1.2 to 1.8 or is a hydroxyethyl cellulose having a hydroxyethyl content (MS) of from 1.4 to 2.4.

11. A method comprising:

forming the granular wet cement composition as claimed in claim 1 by mixing water, hydraulic cement and graded aggregate to form a wet cement composition, adding thereto the cellulose ether composition and any superplasticizer(s) as a dry powder thereto and mixing in a pump or a pug mill mixer, applying the granular wet cement composition to a substrate without a mold or a form, and then paving or rolling the wet cement compositions to form a concrete or cement layer.

\* \* \* \* \*